Feb. 2, 1960   JEAN-LUC BERRY   2,923,533
LIQUID PHASE-FLUID PHASE CONTACTING APPARATUS
Filed Dec. 26, 1956   2 Sheets-Sheet 1
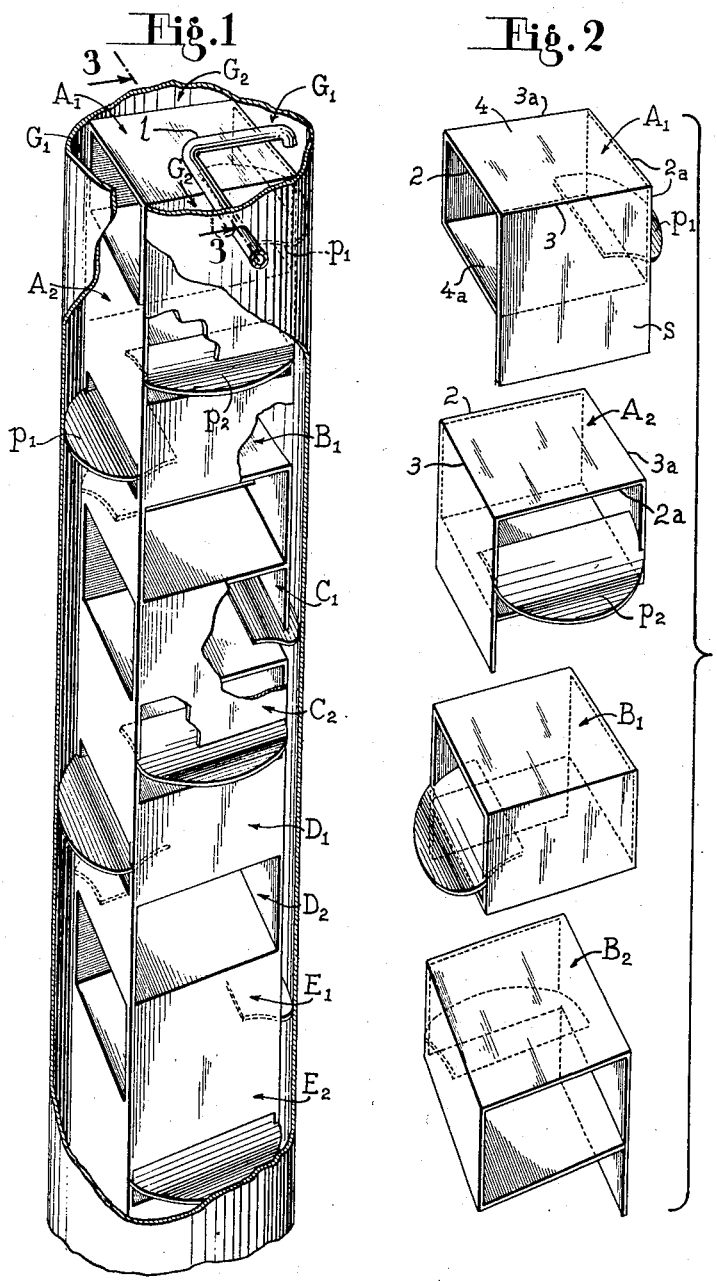
INVENTOR:
JEAN-LUC BERRY
By
Richardson, David and Nardon
ATTYS.

Feb. 2, 1960
JEAN-LUC BERRY
2,923,533
LIQUID PHASE-FLUID PHASE CONTACTING APPARATUS
Filed Dec. 26, 1956
2 Sheets-Sheet 2
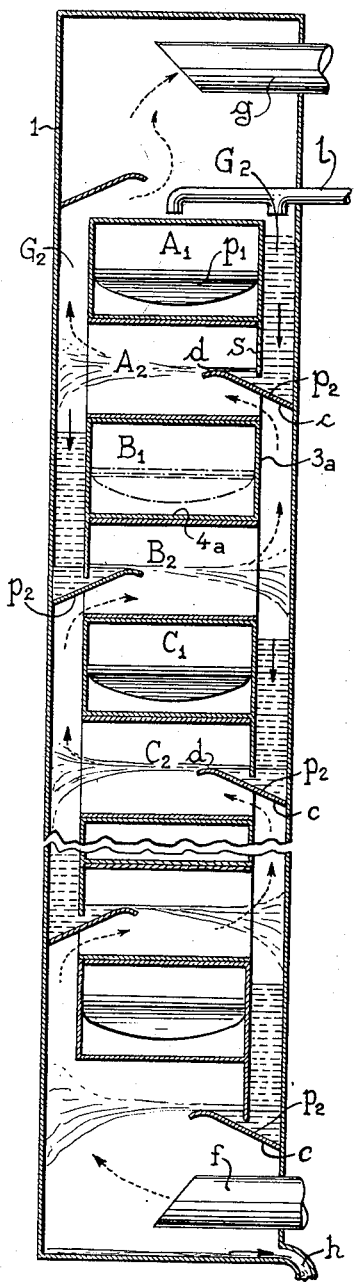
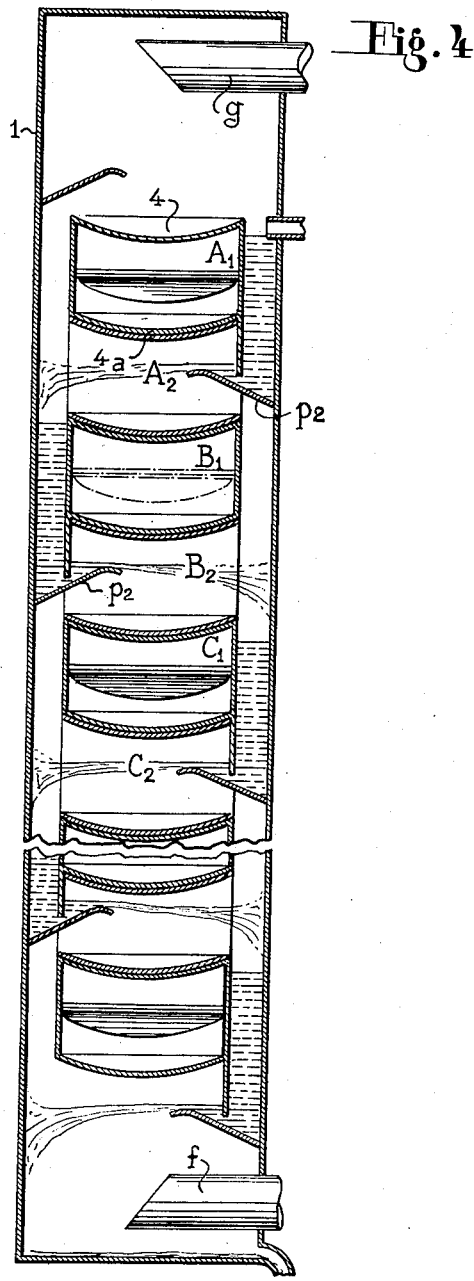
INVENTOR:
JEAN-LUC BERRY
BY
Richardson, David and Nordon
ATTY's

United States Patent Office 2,923,533
Patented Feb. 2, 1960

2,923,533

LIQUID PHASE-FLUID PHASE CONTACTING APPARATUS

Jean-Luc Berry, Firminy, France

Application December 26, 1956, Serial No. 630,617

Claims priority, application France December 30, 1955

7 Claims. (Cl. 261—110)

The present invention relates to apparatus for bringing two fluid-phases into contact, one of said phases being a liquid and the other, hereinafter termed "light phase," being a gas, vapour, or a liquid of lower density than the first-mentioned liquid and immiscible with the latter.

The invention particularly concerns apparatus in which is effected distillation, gas washing or extraction of a liquid by another liquid.

The applicant has already described in his copending U.S. patent application Serial No. 410,624, now Patent No. 2,805,845 of September 10, 1957, a contacting apparatus of this type comprising a column enclosing a series of plates disposed alternately on opposing sides of the column, a closed surface forming a guide screen or baffle disposed above each plate and provided with an extension which extends into the trough supplying liquid to the corresponding plate and thereby forming a hydraulic seal.

Such an apparatus, when used for example as a distilling apparatus, operates in the following manner:

The vapour arriving under the plate is charged with liquid from the plate and the vapour and liquid entrained thereby travel at high velocity and subsequently encounter the wall of the column where the mixture separates into its constituents, the liquid flowing down to the next lower plate, whereas the vapour passes round the baffle and arrives under the next upper plate, and so on.

Such an apparatus operates in a very satisfactory manner but has, however, one disadvantage: the volume enclosed by the baffle constitutes so much wasted space.

According to the present invention, this disadvantage is remedied by using this space in a manner to form one or more additional fluid contacting paths which are interlaced with the first fluid contacting path. The latter can be completely independent or operate in parallel or in series with the additional fluid contacting path or paths, which improves or multiplies the output of the column for a given height or diameter of the latter.

The object of the invention is to provide an apparatus for bringing fluid phases into contact which comprises within a column, a plurality of superimposed chambers, having two open opposing sides through which open sides said chambers intercommunicate in groups by way of the column, the number of said groups corresponding to the number of individual fluid contacting paths each of which latter is provided with an inlet and an outlet for the light phase and an inlet and an outlet for the liquid, plates fixed to the inner wall of the column in such manner as to extend alternately into the successive chambers of the same path through one of the open sides of said chambers, and then into the opposite side, each plate having a liquid supply trough adjacent the end thereof at which it is fixed to the inner wall of the column and a discharge sill at the other end of the plate, each chamber comprising at the base thereof a substantially vertical wall downwardly extending into the trough of the next lower chamber whereby to form a hydraulic seal for the liquid the trough is adapted to contain.

As concerns each path, the operation of the apparatus of the present invention, is identical to the operation of the known apparatus described above except that the baffles or guide screens of one path are formed by the walls of the chambers of the other path or paths.

In a preferred embodiment, if $n$ paths are provided, where $n$ is an integer equal to at least 2, the chambers in each path are separated from one another by $n-1$ chambers of the remainder of the paths, and the planes of the paths intersect on the axis of the column and form between them equal angles. Thus, in the simplest arrangement, two paths are provided in the column, the chambers in each path being separated from one another by a chamber of the other path, and the planes of the two paths intersect at 90° on the axis of the column.

Further features and advantages of the invention will be apparent from the ensuing description with reference to the accompanying drawings to which the invention is in no way limited.

In the drawings:

Fig. 1 is a partial broken-away perspective view of a fluid contacting column embodying the invention, there being two fluid contacting paths;

Fig. 2 is an exploded perspective view of four successive chambers of the column shown in Fig. 1, in their relative positions;

Fig. 3 is a sectional view taken along line 3—3 of Fig. 1, and

Fig. 4 is a view corresponding to that of Fig. 3 of a modification of the invention.

To facilitate description, an embodiment of the invention comprising only two interlaced paths will be considered. It will, however, be understood that the ensuing description also applies in a general way to an apparatus having more than two interlaced paths.

With reference to Fig. 1, the apparatus comprises a column consisting of a cylindrical wall 1 having a vertical axis and in which are disposed successive superimposed chambers designated in their order by $A_1$, $A_2$, $B_1$, $B_2$, $C_1$, $C_2$, $D_1$, $D_2$, $E_1$, $E_2$ . . . . The group of chambers having the index 1 forms a first fluid contacting path and the group of chambers having the index 2 forms a second fluid contacting path. Each of said chambers has a parallelepipedic shape and is fixed to the wall 1, as by welding, along the corners of the chamber either directly or through the medium of an interposed member. Each chamber is open on two opposed vertical sides 2, 2ª and closed on the other two vertical sides 3, 3ª and on the horizontal sides 4, 4ª. Although each chamber has been shown to have individual horizontal sides 4 and 4ª, for reasons of clarity, it will be obvious that the side 4 of one chamber may coincide with the side 4ª of the next higher chamber and its side 4ª may coincide with the side 4 of the next lower chamber.

As can be seen, all the open sides pertaining to one contacting path are bisected by a diametral plane of the column whereas all the open sides of the second contacting path are bisected by a diametral plane perpendicular to the first-mentioned diametral plane. The chambers of the same path intercommunicate through their open sides by way of passageways formed between the chambers and the wall 1, that is, passageways $G_1$ for the first fluid contacting path, and passageways $G_2$ for the second fluid contacting path.

In each fluid contacting path the side 2ª of each chamber has extending therethrough a plate fixed to the wall 1, whereas the side 2 has no such plate. The plates of the first path have been designated by the reference character $p_1$ and the plates of the second path by the reference character $p_2$. It will be observed that in a given contacting path, each plate ($p_1$ or $p_2$) is fixed to the wall 1 on the opposite side of the axis of the column to the plate pertaining to the immediately adjacent chamber of the same path.

Each plate ($p_1$ or $p_2$) divides the corresponding passageway ($G_1$ or $G_2$) into two parts which can intercommunicate only by way of the interior of the chamber into which said plate extends. Said plate forms, at the end thereof fixed to the wall of the column, a liquid supply through $c$, the liquid being received from the part of the passageway above the trough whereas the opposite end of said plate forms a discharge sill $d$ (Fig. 3). Extending into each trough $c$ is a vertical wall $s$ which is the extension of the vertical wall 3 of the next higher chamber of the other fluid path and which thus constitutes a hydraulic seal with the trough. Each fluid contacting path is furthermore provided with a fluid inlet $f$ and a liquid outlet $h$ at its lower end, a liquid inlet $l$ intermediate its height, and a fluid outlet $g$ at its upper end.

It is clear from Figs. 1 and 2 that one fluid contacting path is interlaced with the other contacting path and that the two paths are in different planes which intersect one another on the axis of the column at 90°. The chambers $A_1$, $B_1$, $C_1$ etc. of one path are separated from one another by the interposed chambers $A_2$, $B_2$, $C_2$ etc. of the other path. The chambers pertaining to both paths are in superimposed adjoining relation to one another. Thus, defined in general terms, if there are $n$ interlaced fluid contacting paths, the successive chambers of the same path are separated from each other by $n-1$ chambers of the remainder of the contacting paths and the planes of the different paths intersect on the axis of the column and make between them equal angles, that is angles of $$\frac{360°}{2n}$$

The operation of one of the fluid paths, for example the second path, will now be examined, the other path operating in identical manner.

The light fluid phase (dotted arrow) coming from a lower chamber (for example chamber $C_2$) is charged, as it passes by the sill $d$ of the plate $p_2$ of the chamber $B_2$, with liquid flowing off said plate. The mixture of liquid and fluid thereby obtained travels at high velocity toward the opposite wall of the column (or any other impact wall attached to the column so as to reduce wear of the latter) and strikes this wall. As a result of impact against the wall, the heavy particles, that is the liquid particles, fall through the corresponding passageway $G_2$ onto the plate $p_2$ of the chamber $C_2$. The light particles, after having passed round the baffle, formed by the walls $3^a$, 4, $4^a$ of the upper chamber $B_1$ of the other fluid path pass under the next upper plate $p_2$ of the chamber $A_2$, where the process is repeated, the light phase subsequently passing through the outlet $g$. In the presently-described embodiment, the outlet and inlet tubes $g$ and $f$ are common to the two paths, which operate in parallel. If desired, the upper and lower parts of the column could be so partitioned as to obtain independent inlets and outlets for the different paths.

It is clear from the foregoing that the walls of the chambers of one of the fluid paths form baffles for the other fluid path. Further, the extensions $s$ of the walls 3 of one of the fluid paths form hydraulic seals for the other path. Said hydraulic seals or valves have a relatively great height since the walls 3 serve the same function as the extensions $s$. Thus there may be a considerable pressure head between the two sides of the hydraulic seals, which results in a high velocity of the light phase and in consequence a high rate of flow, in each path.

Each path operates as though the other path did not exist. Thus, according to the invention, it is possible to provide, in a column of given height, two paths, owing to the fact that use is made of the space taken up by the baffles of one of the paths to form the chambers of the other path.

The apparatus thus arranged may be used as a distillation column, the light phase being the vapour of the distilled liquid. The apparatus may also serve to wash a gas, which forms the light phase, by means of a liquid. In both cases, the cross-sectional areas of the passageways $G_1$ and $G_2$ formed on both sides of the chambers, instead of being identical may be made to differ by offsetting the chambers relative to the axis of the column so that at each level the light phase, which has a greater volume, passes through a passageway which is larger than that of the liquid passageway. The apparatus could also serve to bring two immiscible liquids into contact, the light phase being the less dense liquid, so as to extract a constituent of one of the liquids by means of the other. In this case, the arrangement of the chambers and passageways $G_1$ and $G_2$ shown in the figures is especially appropriate.

Fig. 4 shows a modification of the apparatus shown in Fig. 3 in which the upper walls 4 and lower walls $4^a$ of the chambers are substantially dished shaped, the upper face of the walls being concave instead of flat. This is advantageous for the following reason. In the event of a sudden stoppage in the operation of the column, the liquid contained in the hydraulic seal of each plate $p$ runs away over the still $d$. In the embodiment shown in Fig. 3, the liquid continues to flow down to the base of the column and the result of this is that a certain amount of time is required before normal operation is resumed when it is desired to put the column back into operation. In the modification shown in Fig. 4, however, this liquid is collected in the concave walls of the chambers and in consequence normal operation is much more rapidly resumed when the column is put back into operation. Furthermore, the guiding of the vapour is better effected by curved walls than by flat walls owing to less pressure loss. Further, the dished shape of the walls is more pressure resistant and it is possible to operate two interlaced fluid paths at different pressures.

Although specific embodiments of the invention have been described, many modifications and changes may be made therein without departing from the scope of the invention as defined in the appended claims.

Having described my invention what I claim as new and desire to secure by Letters Patent is:

1. An apparatus for bringing a light fluid phase and a heavy liquid phase in contact with one another, comprising a column having a cylindrical wall and a substantially vertical axis; inlet and outlet means for the light fluid phase and inlet and outlet means for the heavy liquid phase; interlaced phase contacting paths disposed in said column the median planes of said paths intersecting one another substantially on said axis, the angles formed between said intersecting median planes on said axis being substantially equal; each contacting path comprising a substantially vertical row of phase contacting chambers fixed to said wall, means defining a pair of substantially vertical passageways disposed between the chambers and said wall on opposite sides of said axis, the median planes of said passageways substantially coinciding with the median plane of the path, a pair of apertures provided in each chamber on opposite sides of said axis and putting the chambers in communication with the passageways, a plate provided for each chamber and fixed to said wall and extending from the latter across one of said passageways and through one of the apertures in the chamber, each plate being fixed to said wall on the opposite side of said axis to the plate pertaining to the immediately adjacent chamber of the path, a trough for containing the heavy liquid phase formed in each plate in the part of the latter adjacent said wall, a sill formed at the end of each plate remote from the plates attachment to said wall, a wall downwardly extending from the top of each chamber into the trough of the plate provided for said chamber and forming a hydraulic seal with the heavy liquid phase the trough is adapted to contain, and means defining a substantially vertical impact surface for each chamber, which surface is disposed in substantially horizontal alignment with the sill of the plate provided for the chamber and on the opposite side of said axis to the plate; and the chambers pertaining to said contacting paths being in superimposed adjoining relation to one another.

2. An apparatus as claimed in claim 1, wherein the chambers are each defined in the vertical direction by upper and lower walls which are substantially dished shaped the upper face of which is concave, whereby to form troughs for receiving the heavy liquid phase when the apparatus is stopped from operating, and to render said upper and lower walls more resistant to the difference between the pressures prevailing on both sides thereof.

3. An apparatus for bringing a light fluid phase and a heavy liquid phase in contact with one another, comprising a column having a cylindrical wall and a substantially vertical axis; inlet and outlet means for the light fluid phase and inlet and outlet means for the heavy liquid phase; $n$ phase contacting paths disposed in said column, the median planes of said paths intersecting one another substantially on said axis, the angles formed between said intersecting planes on said axis being substantially equal, and $n$ being an integer equal to at least 2; each contacting path comprising vertically spaced phase contacting chambers fixed to said wall, and means defining a pair of substantially vertical passageways disposed between the chambers and said wall on opposite sides of said axis, the median planes of said passageways substantially coinciding with said median plane of the path, a pair of apertures provided in each chamber on opposite sides of said axis and putting the chambers in communication with the passageways, a plate provided for each chamber and fixed to said wall and extending from the latter across one of said passageways and through one of the apertures in the chamber, each plate being fixed to said wall on the opposite side of said axis to the plate pertaining to the immediately adjacent chamber of the path, a trough for containing the heavy liquid phase formed in each plate in the part of the latter adjacent said wall, a sill formed at the end of each plate remote from the plate's attachment to said wall, a wall downwardly extending from the top of each chamber into the trough of the plate provided for said chamber and forming a hydraulic seal with the heavy liquid phase the trough is adapted to contain, and means defining a substantially vertical impact surface for each chamber, which surface is disposed in substantially horizontal alignment with the sill of the plate provided for the chamber and on the opposite side of said axis to the plate; the chambers pertaining to said contacting paths being in superimposed adjoining relation to one another and each chamber of each path being separated from the immediately adjacent chamber of the same path by $n-1$ chambers pertaining to the remainder of said paths.

4. An apparatus as described in claim 3, wherein $n=2$ and the median planes of the two phase contacting paths intersect at right angles.

5. An apparatus for bringing a light fluid phase and a heavy liquid phase in contact with one another, comprising a column having a cylindrical wall and a substantially vertical axis; inlet means for the light fluid phase at the lower part of the column and outlet means for the light fluid phase at the upper part of the column, inlet means for the heavy liquid phase at the upper part of the column and outlet means for the heavy liquid phase at the lower part of the column; two phase contacting paths disposed in said column, the median planes of said paths intersecting one another substantially on said axis at right angles; each contacting path comprising vertically spaced phase contacting chambers having substantially vertical corners, means connecting said corners to said wall in such manner as to form a pair of substantially vertical passageways disposed between the chambers and said wall on opposite sides of said axis in the plane of the path, a pair of apertures provided in each chamber on opposite sides of said axis and putting the chambers in communication with the passageways, a plate provided for each chamber and fixed to said wall and extending from the latter across one of said passageways and through one of the apertures in the chamber, each plate being fixed to said wall on the opposite side of said axis to the plate pertaining to the immediately adjacent chamber of the path, a trough for containing the heavy liquid phase formed in each plate in the part of the latter adjacent said wall, a sill formed at the end of each plate remote from the plate's attachment to said wall, a wall downwardly extending from the top of each chamber into the trough of the plate provided for the chamber and forming a hydraulic seal with the heavy liquid phase the trough is adapted to contain, and means defining a substantially vertical impact surface for each chamber, which surface is disposed in substantially horizontal alignment with the sill of the plate provided for the chamber and on the opposite side of said axis to the plate; the chambers pertaining to said two contacting paths being in superimposed adjoining relation to one another and each chamber of each path being separated from the immediately adjacent chamber of the same path by a chamber pertaining to the other of said paths.

6. An apparatus as claimed in claim 5, wherein the inlet means and the outlet means of the light fluid phase and of the heavy liquid phase are common to both contacting paths.

7. An apparatus as claimed in claim 5, wherein each chamber is defined in the vertical direction by upper and lower walls which have a dished configuration, the upper faces of which walls are concave, whereby to form troughs for receiving the heavy liquid phase when the apparatus is stopped from operating, and to render said upper and lower walls more resistant to the difference between the pressures prevailing on both sides thereof.

References Cited in the file of this patent

UNITED STATES PATENTS

| 960,223 | Guillaume | May 31, 1910 |
| 1,422,184 | Curme | July 11, 1922 |
| 2,303,811 | Badenhausen | Dec. 1, 1942 |

FOREIGN PATENTS

| 323,474 | Germany | July 27, 1920 |
| 476,334 | Great Britain | Dec. 2, 1937 |
| 1,143,343 | France | Apr. 8, 1957 |